United States Patent [19]

Watkinson

[11] 3,728,634

[45] Apr. 17, 1973

[54] MUTING ARRANGEMENT FOR COMMUNICATION RECEIVERS EMPLOYING COUNTERS TO PRODUCE CONTROL SIGNALS FROM INTERFERING BEAT FREQUENCIES OF THE RECEIVED SIGNALS

[75] Inventor: Stephen William Watkinson, Cambridge, England

[73] Assignee: Pye Limited, London, England

[22] Filed: Jan. 28, 1971

[21] Appl. No.: 110,453

[30] Foreign Application Priority Data

Feb. 5, 1970 Great Britain ....................... 5,515/70

[52] U.S. Cl. .................. 325/478, 325/316, 325/317, 325/322, 325/324, 325/325, 325/348, 325/472, 325/474, 328/163, 328/165, 330/35

[51] Int. Cl. ................................................ H04b 1/10

[58] Field of Search ........................ 325/64, 302, 306, 325/316, 348, 402, 403, 478, 56, 303, 307, 474, 472, 324, 317, 322, 325; 330/35; 307/251; 179/15 BT; 328/163, 165, 167

[56] References Cited

UNITED STATES PATENTS

| | | | |
|---|---|---|---|
| 3,334,187 | 8/1967 | Pampel | 179/15 BT |
| 3,437,937 | 4/1969 | Warfield | 325/478 |
| 3,543,165 | 11/1970 | Tomsa | 325/478 |
| 3,569,840 | 3/1971 | Tanaka | 325/478 |
| 3,550,012 | 12/1970 | Paul | 325/478 |
| 3,482,174 | 12/1969 | James | 307/251 |

*Primary Examiner*—Albert J. Mayer
*Attorney*—Frank R. Trifari

[57] ABSTRACT

A squelching arrangement for muting a receiver in the absence of signals received from a plurality of transmitters operating at frequencies offset from the mean frequency to which the receiver is tuned. Interfering beat frequencies of the received signals in either a communication or auxiliary channel are counted to produce a squelch control signal. This control signal then operates a gating circuit that passes the received signals if the interfering beats are of a predetermined amplitude and frequency.

16 Claims, 4 Drawing Figures

MUTING ARRANGEMENT FOR COMMUNICATION RECEIVERS EMPLOYING COUNTERS TO PRODUCE CONTROL SIGNALS FROM INTERFERING BEAT FREQUENCIES OF THE RECEIVED SIGNALS

The present invention relates to arrangements for providing muting in a communication system.

In communications receivers, i.e., those used for speech communication, it is usual to employ a muting circuit such that receiver and background noise is not emitted from the loudspeaker or other reproducer in the absence of a carrier wave to which the receiver is tuned, of adequate strength to establish communication. Such mute circuits rectify the noise and utilize the DC control voltage therefrom to hold closed a gate in the main signal path within the receiver, this gate usually being situated in the audio signal path. To prevent speech modulation of the carrier closing the gate, only noise of frequencies above the required speech frequencies, e.g., considerably above 3 KHz, is, by filtering means, passed to the muting circuit.

Receipt of a carrier wave of adequate strength reduces the noise and therefore the control voltage, the latter reduction opening the gate to allow speech to pass.

Where a single transmitter does not provide adequate field strength over a desired reception area it is customary to employ auxiliary transmitters, additional to the main transmitter, to extend the area covered, the auxiliary transmitters receiving speech to be transmitted either by land line or radio link, and, to avoid the difficulties of synchronous transmission, transmitting on frequencies offset by a small amount from that of the main station. The amount of off-set in such a shared channel system is made small but greater than the required highest speech frequency, e.g., 6 KHz, so that a receiver tuned to a mean frequency may receive all the transmitters of the channel without alteration of the tuning.

In parts of the total reception area provided by the transmitters more than one transmitter will be receivable and a receiver positioned in such a way will therefore produce beat frequencies of 6 or 12 KHz, depending on whether one or two auxiliary transmitters are employed, and harmonics thereof extending up to the lowest IF frequency. The provision of a mute circuit then becomes more difficult as the only portions of the frequency spectrum free of such beats and harmonics are comparatively narrow 6 or 12 KHz gaps. Any attempt to use such gaps for muting purposes would entail complex steep cut filtering with little noise energy available from a selected band.

The beat frequencies represent amplitude modulation of a received carrier and as such could be removed in an ideal receiver by adequate limiting before and/or in the discriminator. Such a limiter requires a bandwidth considerably greater than the IF bandwidth and an ability to cope with large amplitude ratios. Alternative techniques have been devised, such as cascaded narrow band limiters as described in "Frequency Modulation Interference Rejection with Narrow Band Limiters," E.J. Baghdady, Proc. I.R.E., January, 1955.

The object of the present invention is to provide a muting arrangement and mute gate for a communication system in which the above complex filtering and circuits are avoided.

The present invention provides an arrangement for muting a communication channel in the absence of a desired signal, in which at least part of the content of the communication or an auxiliary channel is applied to a counting circuit whose output is a function of the repetition rate of the components of the channel content or the part thereof, the output being employed to control the state of a mute gate provided in the communication channel in such manner that the gate is closed when components above a given frequency and amplitude appear in the channel content.

Where the desired signal is transmitted by a main transmitter and an auxiliary transmitter whose frequencies of transmission are offset with respect to each other, the beat frequency produced by the main and auxiliary transmitter in the communication or said auxiliary channel should be below the given frequency.

Where the desired signal is a carrier adapted to be frequency modulated, the communication channel should be capable of receiving and demodulating a frequency modulated signal, the channel content or the part thereof for the counting circuit being derived from a discriminator provided in the communication channel. Alternatively, where the desired signal is a carrier adapted to be amplitude modulated, the communication channel should be capable of receiving and demodulating an amplitude modulated signal, the channel content or the part thereof for the counting circuit being derived from a discriminator provided in the auxiliary channel, the auxiliary channel being capable of handling frequency modulated signals.

Where the arrangement according to the invention is incorporated in a receiver capable of receiving either frequency modulated or amplitude modulated signals, it may include a first channel capable of receiving and demodulating frequency modulated signals and a second channel capable of receiving and demodulating amplitude modulated signals, the first channel forming the communication channel when the receiver is receiving a frequency modulated signal while the second channel forms the communication channel when the receiver is receiving an amplitude modulated signal and at which time the first channel forms the auxiliary channel, the channel content or the part thereof for the counting circuit being derived from a discriminator provided in the first channel. In such a case a mute gate is preferably provided in each of the first and second channels, the gate in the first channel being capable of being opened when the receiver is set for the reception of frequency modulated signals at which time the gate in the second channel is held closed, while when the receiver is set for the reception of amplitude modulated signals the gate in the second channel is capable of being opened at which time the gate in the first channel is held closed.

Where the desired signal is transmitted by a main and auxiliary transmitter having frequencies of transmission close to each other, the given frequency is preferably above the second harmonic of the beat produced by the main and auxiliary transmitters. In such a case the counting circuit may be preceded by a high pass filter the corner frequency of which is above this second harmonic.

The channel content or the part thereof may be amplified and limited prior to its application to the counting circuit while the counting circuit itself may be formed by a diode pump circuit. The output of the counting circuit may be used to control the state of a bistable circuit which may be a Schmitt trigger circuit and whose output may be inverted and applied to the mute gate to control its state.

The mute gate may be formed by a field effect transistor having first and second control electrodes and an output electrode, the path formed by the first control electrode and the output electrode being connected into the communication channel, a control signal representing the output of the counting circuit being applied to the second control electrode when the mute gate is to be closed causing the path to be high resistance. The first and second input electrodes are preferably the source and gate electrodes respectively while said output electrode is the drain electrode. A voltage may be applied to the gate electrode to bias the field effect transistor such that the source-drain path is low resistance, a diode connected to the gate electrode being rendered conducting by the control signal to alter the voltage applied to the gate electrode to cause the source-drain path to be high resistance.

The present invention also provides a mute gate in which a signal path passes through the source-drain path of a field effect transistor, the gate electrode of this field effect transistor having a bias applied thereto to normally hold the source-drain path low resistance and the signal path open, a diode connected to the gate electrode being rendered conducting in the absence of a signal for the signal path to change the bias to the gate electrode rendering the source-drain path high resistance and closing the signal path. A plurality of such mute gate circuits may be employed together with a selector switch provided for selecting one of a plurality of signal paths, the gate electrode of the mute gate in the selected signal path having a bias applied thereto for normally holding this signal path open, the remaining signal paths being closed.

The above and other features of the invention will be more readily understood by a perusal of the following description having particular reference to the accompanying drawings of which:

Figure 1:
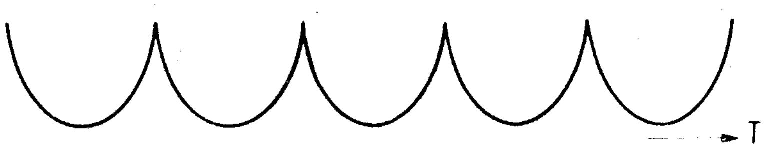
FIG. 1 is a waveform appearing at the output of the discriminator of the receiver.

In areas where signal strengths of two adjacent transmitters differ by at least ± 3 db a well designed angle modulated receiver will differentiate, due to capture effect, between the transmitters and produce no significant interfering beats at the discriminator output, but where the signals are within the above 6 db band, and especially when nearly equal, the beat output from the discriminator is non-sinusoidal and has a high harmonic content, so contaminating the whole frequency band of noise, i.e., up to the second IF frequency of 455 KHz, with modulation products and/or harmonics of the beat frequencies. A typical waveform for such a discriminator output is shown in FIG. 1 in which the repetition rate of the waveform peaks is the beat or difference frequency of the two transmitters. A high pass filter with a corner frequency above the highest fundamental beat will therefore not alone be sufficient to separate noise and interfering beats.

A method of preventing interfering beat frequencies from operating the mute is to make the noise detector incapable of gate operation when fed with impulses which occur at or below the repetition rate of the beat, as in such a case the harmonic content of the beat is of no consequence. A circuit that meets this requirement is a pulse counter, or more precisely a circuit which gives a DC output voltage or current proportional to the repetition rate of an input, preceded by a filter.

With the beat considered as a series of pulses, first passed through a high pass filter and a limiting amplifier with a restricted upper frequency limit the output therefrom are pulses of substantially constant width and amplitude and a diode pump circuit may be employed for counting.

Such a circuit will also respond to noise impulses as these may be defined in terms of clicks per second vide S.O. Rice, Noise in FM Receivers, Proceedings of Symposium, Time Series Analysis, Brown University, June, 11–14 1962. The distribution plot of amplitude against occurrence of such noise impulses is of Gaussian character with no carrier present as shown in curve A of FIG. 2. Curve B of this Figure indicates the effect of a small signal and curve C the distribution at the threshold of full improvement, defined as the point where the plot of noise against carrier level deviates by more than 1 db from the portion of linear slope and at which the signal and noise to noise ratio is of the order of 10 db, a readable signal and the usual operating point of a mute control circuit. For a carrier level greater than the threshold value both occurrence and amplitude are reduced as shown in curve D.

Figure 2:
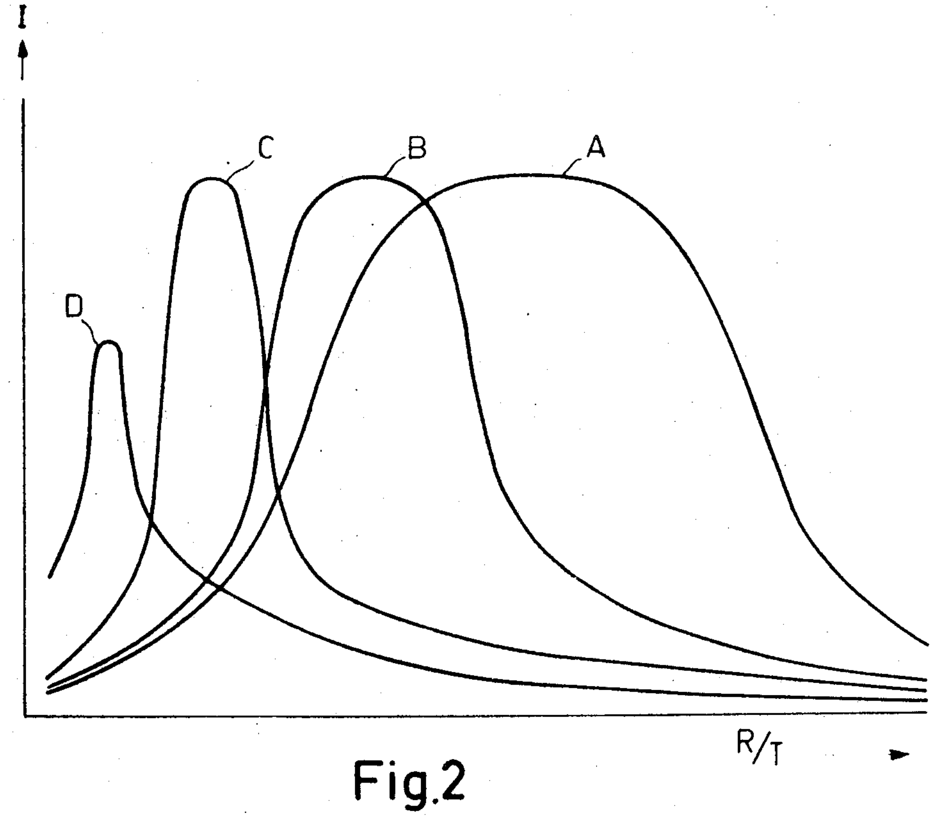
FIG. 2 illustrates the change of distribution and amplitude of noise in the receiver with variation of carrier level.

As shown by the curves of FIG. 2, there is a change in the number of noise pulses as carrier level is increased from zero and a counting circuit will therefore give a reduced output for increased carrier level which change in output may be used for operation of a gate.

Figure 3:
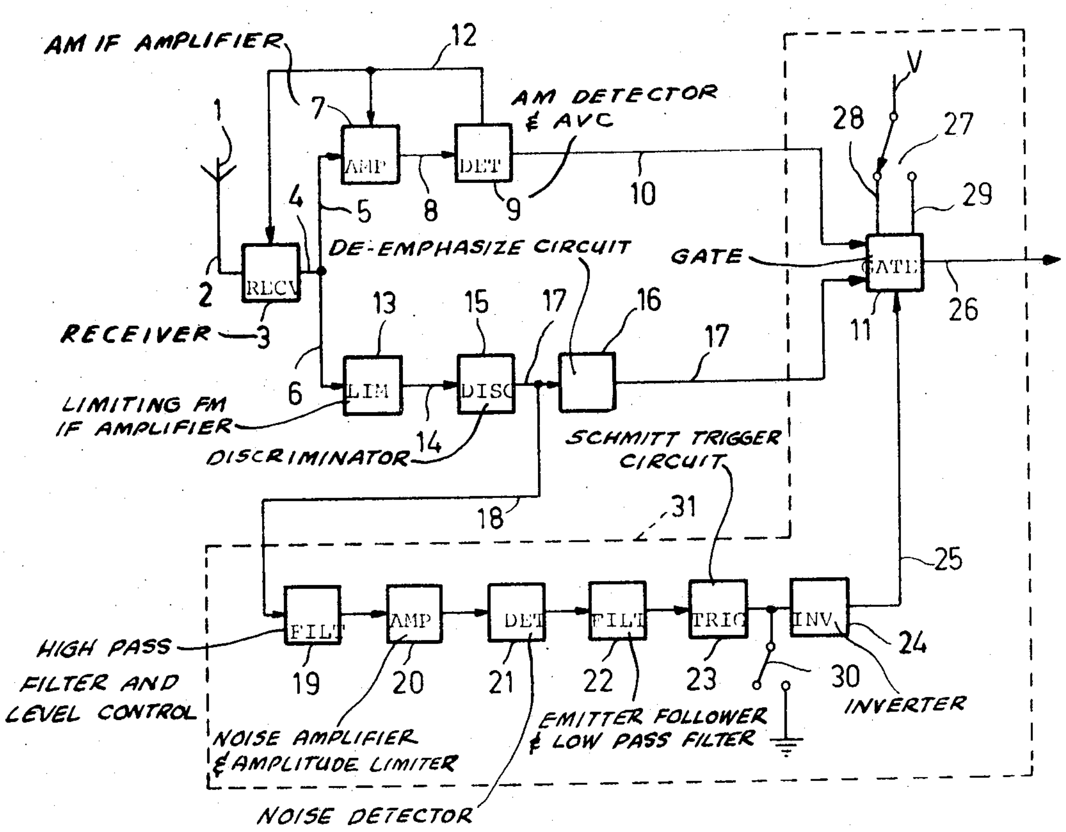
FIG. 3 shows a block diagram of part of a radio receiver embodying the invention.

A block diagram of part of a receiver using the above principle is shown in FIG. 3 in which a signal received on an aerial 1 is passed on a line 2 to the front portion 3 of a receiver, the front portion including R.F., first mixer, first local oscillator, first IF filter, first IF amplifier, second mixer and second local oscillator stages. The output from portion 3 is the second IF signal, in this case at 455 KHz, and appears on line 4 which is branched in two directions to lines 5 and 6. Branch 5 is connected to an AM IF amplifier 7 whose output is passed on line 8 to an AM detector and AVC stage 9, the audio output from which is passed on line 10 to a first input of a muting gate 11. An AVC voltage from stage 9 is fed back over line 12 to the AM IF amplifier 7 and to at least one of the stages of the receiver front portion 3. Branch 6 passes the second IF frequency signal to a limiting FM IF amplifier 13 whose output is passed on a line 14 to a discriminator 15, the audio output from which passes, via a de-emphasis circuit 16, on a line 17 to a second input of gate 11.

The output from discriminator 15 is also passed on a line 18 to the muting circuit comprising sequentially a high pass filter and level control 19, a two stage noise amplifier and amplitude limiter 20 and whose upper frequency limit is restricted, a noise detector in the form of a counting or pulse rate detecting circuit 21, an emitter follower and low pass filter 22, a Schmitt trigger circuit 23 and an inverter 24. The high pass filter 19 has a corner frequency of about 30 KHz which is above the second harmonic of the highest beat produced when a main and two auxiliary transmitters are employed spaced at 6 KHz intervals. The output from inverter 24 is passed on line 25 to the control input of gate 11, the arrangement being such that with no received signal, either AM or FM, i.e., noise present at the discriminator 15, a DC voltage output is obtained from counter 21 which counts the noise pulses and line 25 is at a low voltage level and gate 11 is closed to block a selected audio path. Receipt of an adequate signal reduces the noise at the discriminator output and the DC output voltage of counter 21 drops below a predetermined level and changes line 25 from low to a high voltage level to open gate 11. With gate 11 open either the audio output on line 10 or on line 17 is passed through the gate and appears on its output line 26 to activate the following (not shown) audio sections of the receiver. Selection of the required audio signal from lines 10 and 17 is by means of a switch 27 which in its alternative positions supplies a DC bias voltage from a source V to one or other of lines 28 and 29 connected to the gate 11. A further switch 30, when operated from the shown open position, earths the input to inverter 24 and puts line 25 to the high voltage level, so opening gate 11 and thus providing a mute over-ride or disable facility.

Figure 4:
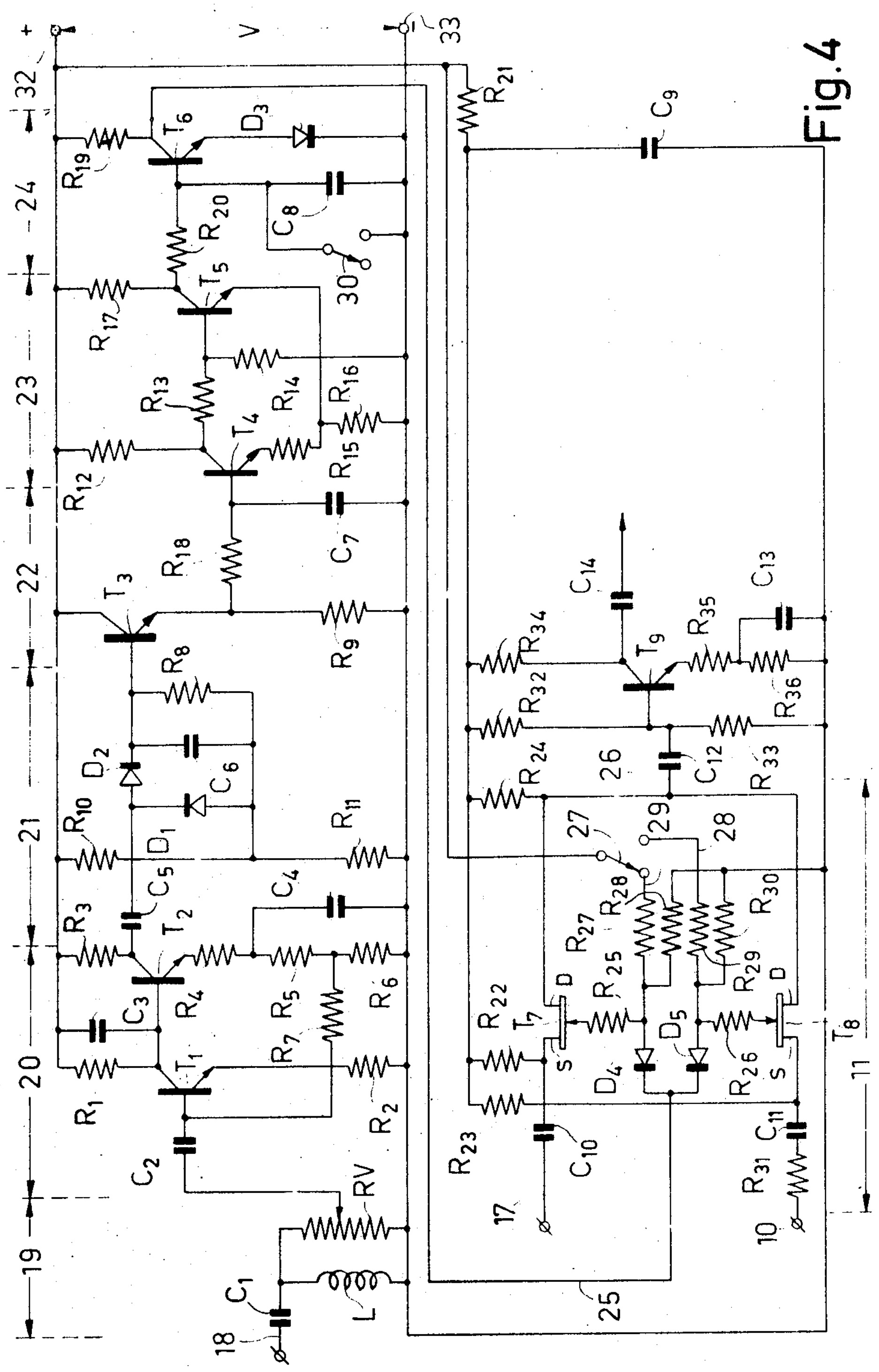
FIG. 4 is a circuit diagram of parts of the receiver of FIG. 3.

The parts of FIG. 3 enclosed within the broken line 31 are shown in the circuit diagram, FIG. 4 in which parts common to the two figures have the same references.

In FIG. 4 a capacitor C1 and an inductor L comprise the high pass filter (19) with the corner frequency of about 30 KHz, the portion of the input, from discriminator (15) via line 18, appearing across the inductor being applied to a potentiometer RV, the sliding contact of which provides an adjustment for the level (19) at which the mute circuit operates.

Signal components appearing on the slide of potentiometer RV is applied via a capacitor C2 to the amplifier (20) comprising transistors T1 and T2 supplied from a DC supply voltage V connected to positive and negative terminals 32 and 33 respectively. Transistor T1 has a collector load resistor R1 and an unbypassed emitter resistor R2, the collector load being shunted by a capacitor C3 limiting the amplifier frequency response to some 300 KHz. Transistor T2 base is directly coupled to the collector of transistor T1 and has a collector load resistor R3 and serially connected emitter resistors R4, R5 and R6, the latter two being shunted by a capacitor C4. A resistor R7 between the base of transistor T1 and the junction of resistors R5 and R6 provides base bias for transistor T1 and DC negative feedback to stabilize the amplifier. The values of the collector and emitter resistor are such that limiting of the output occurs above a predetermined level of input signal.

The output from the collector of transistor T2 is passed to a diode pump counting circuit (21), comprising a capacitor C5, diodes D1 and D2, a capacitor C6 and a resistor R8, whose output is applied to the base of a transistor T3, operating as the emitter follower (22) and having a resistor R9 as its emitter load. The junction of a pair of resistors R10 and R11, serially connected across the supply V, provides, via resistor R8, base bias for transistor T3.

Three resistors R12, R13 and R14 are serially connected across the supply, the junction of the first two being connected to the collector of a transistor T4 and the junction of the latter two to the base of a transistor T5. Transistor T4 has an emitter resistor R15 serially connected to a resistor R16 common to the emitter circuits of both transistors T4 and T5, the latter transistor having a collector load resistor R17. The circuit forms the Schmitt trigger (23) and is fed, via a low pass filter (22) removing AC noise components from the emitter output of transistor T3, the filter comprising a resistor R18 and a capacitor C7. Bias supplied to transistor T3 from the junction of resistors R10 and R11 is such that, in the absence of an output from the pump counting circuit (21) or with an output below a predetermined level, transistor T5 is conducting and its collector is at a low, close to zero, voltage, but with a pump output greater than the predetermined level, transistor T5 is cut off and its collector voltage is substantially that of the supply.

A transistor T6, having collector and emitter loads of resistor R19 and diode D3 respectively, has its base DC coupled to the collector of transistor T5 via a resistor R20 and forms the inverter (24), the output from the collector on line 25 being the inverse of that of the Schmitt trigger transistor T5 collector, i.e., low in the presence of noise and high when noise is reduced. Diode D3, which may be a Zener diode, provides a well defined action to the switching of the two levels on line 25, while closure of the switch 30, connecting the base of transistor T6 to the negative supply terminal 33 holds the mute circuit inoperative with line 25 held at the high voltage level. A capacitor C8, connected between the base of transistor T6 and the negative supply terminal provides RF decoupling for the inverter.

The level of output from the pump circuit due to beat harmonics from off set carriers is of insufficient amplitude to cause change over of the Schmitt trigger so that the presence or absence of a beat harmonic from off set carriers does not affect the operation of the circuit by relative amounts of noise.

The gate (11) is fed from the supply by a resistor R21 decoupled by a capacitor C9, and comprises two Field Effect Transistors T7 and T8 both being *n* channel devices the sources of which are supplied from the decoupled positive line by respective resistors R22 and R23 and whose drains are supplied through a common resistor R24. Each FET T7, T8, respectively has its gate connected via a high value resistor R25, R26 to the junction of two serially connected resistors R27, R28 and R29, R30 connected between lines 29, 28 and the negative supply line. Switch 27, when in the shown position, connects the positive supply line to line 29 and provides bias for the FET T7 to make its source/drain resistance low, and in its other position, connecting line 28 to positive, similarly reduces the source/drain resistance of FET T8. Speech signals from the discriminator (15) and de-emphasis circuit (16) are applied on line 17 to the source of FET T7 via a capacitor C10 and from the AM detector (9) on line 10 to the source of FET T8 via a resistor R31 and a capacitor C11, the speech signal from the relevant line being passed by the selective operation of switch 27. The anodes of two diodes D4 and D5 are respectively connected to the junction of resistors R25, R27 and R26, R29, while their cathodes are commoned and connected to line 25. When this line is at a low voltage level, i.e., noise present at the mute input (18), the FET selected by switch 27 will have the gate bias reduced by one of the diodes conducting to a voltage well below pinch off and the FET selected will now have a high resistance source/drain path preventing the passage of a speech signal. Reduction of input noise will change line 25 to a high voltage level, the diode then being reversed biased and non-conducting, so allowing the selected FET to be biased to its low resistance condition and allowing the passage of speech signals from the selected FM or AM channel.

Speech so passed is transmitted form the selected FET drain via a line 26 through a capacitor C12 to a conventional amplifying stage comprising potential divider resistors R32 and R33 providing base bias for a transistor T9 having a collector load resistor R34 and serially connected emitter resistors R35, R36, the latter of which is bypassed by a capacitor C13. Output from the collector of transistor T9 is coupled to following audio circuits through a capacitor C14, the upper frequency limit of such audio output being limited as required by, for example, a capacitor in parallel with load resistor R34, such that the response falls off above 3KHz.

The use of field effect transistors for the gate instead of bipolar transistors results in a minimum of transients being developed during switching by change in noise level or selection as change in voltage levels due to current flow are largely avoided, there being substantially no change of DC level at source or drain. The switching selection by means of a control voltage in place of audio switching provides a facility for placing the selector switch at a point remote from the receiver while retaining short audio paths within the receiver.

I claim:

1. An arrangement for squelching a communication receiver in the absence of signals received from a plurality of transmitters operating at adjacent frequencies slightly offset from the mean operating frequency of the receiver, comprising signal input means, means for detecting said received signals coupled to said signal input means, means coupled to said detecting means for counting interfering beats between the frequencies of said received signals to produce a control signal, and gating means connected to said detecting means and controlled by said control signal to pass said received signals when said interfering beats are of predetermined amplitude and frequency.

2. An arrangement as claimed in claim 1, wherein said detecting means are capable of demodulating a frequency modulated carrier, said control signal being derived from a discriminator in said detecting means.

3. An arrangement as claimed in claim 1, wherein said detecting means are capable of demodulating amplitude modulated signals and frequency modulated signals, said control signal being derived from said frequency modulated signals.

4. An arrangement as claimed in claim 3, wherein said detecting means comprises first and second communication channels, said first channel being capable of demodulating said amplitude modulated signals, said second channel being capable of demodulating said frequency modulated signals, said first channel operating as a main communication channel and said second channel operating as an auxiliary communication channel when amplitude modulated signals are being received and said second channel operating as a main communication channel when frequency modulated signals are being received.

5. An arrangement as claimed in claim 4, further providing gating devices in said first and second channels, the gate in said first channel being opened and the gate in said second channel being closed when frequency modulated signals are being received and the gate in said first channel being closed and the gate in said second channel being opened when amplitude modulated signals are being received.

6. An arrangement as claimed in claim 1, wherein said gating means passes signals when the frequency of said interfering beats is above its second harmonic.

7. An arrangement as claimed in claim 1, further comprising high pass filter means preceding said counting means, the corner frequency of said filtering means being above the second harmonic of said interfering beats.

8. An arrangement as claimed in claim 1, further comprising means for amplifying and limiting said interfering beats preceding said counting means.

9. An arrangement as claimed in claim 1, wherein said counting means comprises a diode pump circuit.

10. An arrangement as claimed in claim 1, further comprising a bistable circuit coupled to said counting means, the output of said counting means controlling the state of said bistable circuit.

11. An arrangement as claimed in claim 10, wherein said bistable circuit comprises a Schmitt trigger circuit.

12. An arrangement as claimed in claim 10, wherein the output of said bistable circuit is inverted and applied to control said gating means.

13. An arrangement as claimed in claim 1, wherein said gating means comprises a field effect transistor circuit having first second, and output electrodes, the path between said first and output electrodes passing said signals when the output of said counting means applied to said second electrode is below a predetermined magnitude.

14. An arrangement as claimed in claim 13, wherein said first and second electrodes are the source and gate electrodes respectively and said output electrode is the drain electrode.

15. An arrangement as claimed in claim 14, wherein a voltage is applied to said gate electrode to bias said field effect transistor so that said source-drain electrodes provide a low resistance path.

16. An arrangement as claimed in claim 14, further comprising a diode connected to said gate electrodes, said diode operating in its conducting state when the output of said counting means is present thereby altering the voltage of the gate electrode of said field effect transistor so that said source-drain electrodes provide a high resistance path.

* * * * *